United States Patent [19]

Graversen et al.

[11] 4,443,120

[45] Apr. 17, 1984

[54] REMOTE CONTROL TEMPERATURE SENSOR WITH EXPANSIBLE MATERIAL

[75] Inventors: Niels P. G. Graversen, Augustenborg; Svend P. Pedersen, Nordborg, both of Denmark

[73] Assignee: Danfoss A/S, Nordborg, Denmark

[21] Appl. No.: 336,963

[22] Filed: Jan. 4, 1982

[30] Foreign Application Priority Data

Jan. 24, 1981 [DE] Fed. Rep. of Germany ....... 3102311

[51] Int. Cl.$^3$ .............................................. G01K 5/10
[52] U.S. Cl. ..................................... 374/201; 242/86; 236/32; 236/42
[58] Field of Search ....................... 374/201, 202, 203; 116/216; 236/42, 32, 99 R; 242/86

[56] References Cited

U.S. PATENT DOCUMENTS 1,733,804  10/1929  Ileman ................................. 374/202
2,099,899  11/1937  Hedfield .............................. 374/202
3,702,157  11/1972  Thomas ................................ 242/86

FOREIGN PATENT DOCUMENTS 486786  7/1920  France ............................... 374/203

Primary Examiner—Charles Frankfort
Assistant Examiner—Denis E. Corr
Attorney, Agent, or Firm—Wayne B. Easton

[57] ABSTRACT

The invention relates to a remote control temperature sensor having a capsule containing an expansible material and a capillary tube which connects the capsule to a radiator valve or the like. The temperature sensor has a housing in which the capsule in rotatably mounted and the housing is a wall where the temperature is to be monitored. The capillary tube is wound around the capsule and is dispensible therefrom any desired distance less than the length of the tube to the radiator valve to which the sensor is to be connected.

1 Claim, 6 Drawing Figures

REMOTE CONTROL TEMPERATURE SENSOR WITH EXPANSIBLE MATERIAL

The invention relates to a remote control temperature sensor with expansible material and a flexible capillary tube which is connected to an expansible material capsule in the sensor housing, is wound into a coil and is led out of the sensor housing through an outlet aperture, for a temperature regulator actuatable by the pressure of the expansible material by way of the capillary tube.

In a known remote control temperature sensor of this kind, the one end of the capillary tube is connected to the expansible material capsule of the sensor and the other end to the temperature regulator, for example a temperature regulating valve, the coil being disposed in front of the installation between the sensor and the temperature regulator. The capillary tube has a length corresponding to the maximum desired distance between the sensor and regulator. During installation, the place for applying the sensor is selected so that, if possible, it lies in an air current which is influenced by disturbing influence and by the heater. The required length of the capillary tube is then unwound from the coil whereas the remainder by which the capillary tube is too long remains coiled.

The invention is based on the problem of providing a remote control temperature sensor of the atated kind in which the capillary tube can be more simply unwound from the coil by the desired length.

According to the invention, this problem is solved in that the coil is wound about the expansible material capsule and the expansible material capsule is rotatably mounted in the sensor housing about an axis coincident with the coil axis.

In this construction, the expansible material capsule at the same time serves as a winding on and off reel. Before installing the capillary tube, it merely has to be pulled off the rotatable expansible material capsule by the desired length. Another advantage is that remaining convolutions of the coil do not disturbingly come into appearance because they are concealed in the sensor housing. Similarly, no difficulties arise during transport of the sensor because no precautions have to be taken against undesirable kinking or bending of the flexible capillary tube. Further, the remaining convolutions of the capillary tube coil are always in the direct vicinity of the expansible material capsule. This contributes to a more accurate temperature measurement at the desired point, particularly if the capsule as well as the capillary tube are filled with the temperature-dependent expansible material, such as an expansible liquid. If a substantial amount of coil remains after the required length of capillary tube has been unwound from the coil, and this remaining coil is arranged at an unobtrusive point remote from the sensor, it could falsify the measurement of the sensor because it acts as a sensor itself, even though less sensitive.

The form of the expansible material capsule is to a large extent optional but an angular shape could lead to kinking of the capillary tube. A cylindrical shape is therefore preferred for the expansible material capsule.

Preferably, the sensor housing comprises a base rotatably mounting the expansible material capsule and, connectible thereto with a snap fit, a cap in which there is formed at least one slit parallel to the rotary axis of the expansible material capsule. This construction permits easy installation of the expansible material capsule about which the capillary tube is coiled, the slit providing a space free for movement in the longitudinal direction for uncoiling the capillary tube and in addition contributing to straightening of the curvature in the capillary tube after uncoiling; it also permits substantially unimpeded access of the surrounding air to the expansible material capsule and to any remaining convolutions of the coil.

The expansible material capsule may be mounted in a slide bearing. This avoids any additional bearing members. A cylindrical expansible material capsule can thus be mounted directly in a complementary bearing aperture.

Preferably, the expansible material capsule is coaxial with the cap of the sensor housing, the end of the capsule adjacent to the cap being supported thereagainst. In this case a single bearing aperture will suffice. At the same time, there will be a particularly small amount of bearing friction if the end wall of the cap forms a cone having its apex supported by the expansible material capsule.

Preferred examples of the invention and its developments will now be described in more detail with reference to the drawing, wherein.

Figure 1:
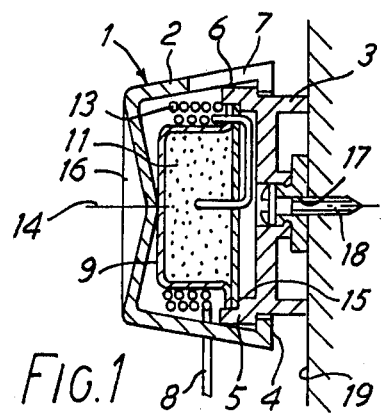
FIG. 1 is an axial section of a first example of remote control temperature sensor according to the invention.
Figure 2:
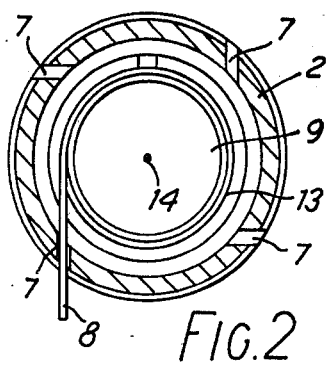
FIG. 2 is a cross-section of the FIG. 1 remote control temperature sensor.

The remote control temperature sensor according to FIGS. 1 and 2 comprises a housing 1 consisting of a cap 2 and a base 3. The conical wall of the cap 2 made of elastic plastics material has a radially inwardly directed flange 4 engaging with a snap fit under a radially outwardly projecting flange 5 of the base 3. To facilitate snapping of the cap 2 over the flange 5, its peripheral face 6 is appropriately conically chamfered.

Figure 6:
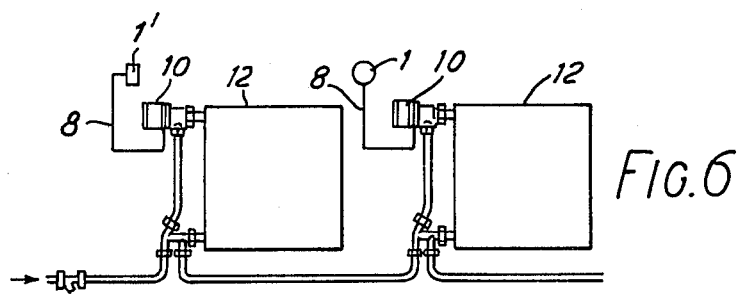
FIG. 6 is an example of an installation of the invention to regulate a radiator.

The cap 2 is provided with slits 7 which extend axially up to the rim of the cap 2 and one of which can be selected as an outlet aperture for a flexible capillary tube 8 which connects a cylindrical expansible material capsule 9 rotatably mounted in the housing 1 to a temperature regulator which is in this case a temperature regulating valve 10 on a radiator 12 (FIG. 6) and actuatable by the pressure of the expansible material 11 contained in the expansible material capsule 9. The slits 7 extend substantially tangentially to the circumference of the expansible material capsule 9.

The capillary tube 8 is generally longer than the distance between the temperature regulator 10 and the place where it is desired to install the remote control temperature sensor, whereby the point of installation can be more freely selected. It is therefore coiled about the expansible material capsule 9 in the housing 1 to form a coil 13 from which the capillary tube 8 can be unwound to the required length by pulling the tube 8 out of the housing 1. The expansible material capsule 9 will turn about an axis 14 which is coincident with the rotary axis of symmetry of the housing 1 which is rotationally symmetric in plan view or in front elevation.

Withdrawal of the capillary tube 8 from the coil 13 at the same time substantially straightens the tube 8 which is of flexible metal, and such straightening is assisted by the slit 7 in question. At the same time, the slits 7 permit the passage right up to the expansible material capsule 9 of the surrounding air of which the temperature is to be measured and controlled. Any remaining length of capillary tube 8 by which it is too long remains as a coil 13 in the housing 1 and is invisible from the outside.

Coaxial with the axis 14, the base 3 has a stepped bore 15 serving as a slide bearing for the one axial end of the expansible material capsule 9. The other end is supported against the inwardly projecting apex of a cone 16 formed by the end of the cap 2, so that the expansible material capsule 9 retains its axial position during uncoiling of the capillary tube 8.

The remote control temperature sensor can be secured to a wall 19 or the like by means of a screw 18 passing through a stepped hole 17 in the bottom of the base 3.

Figures 3, 4, 5:
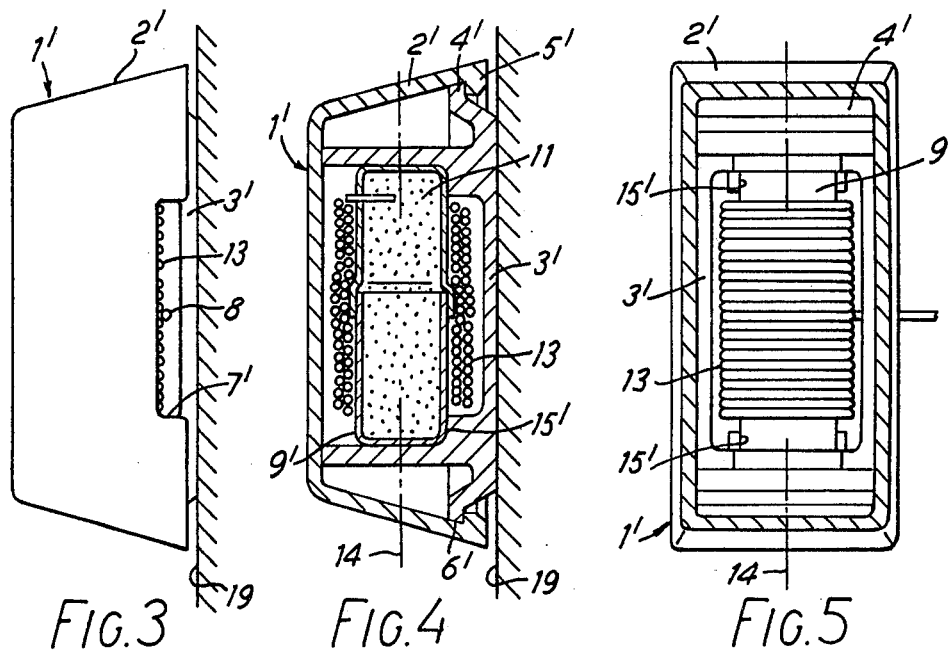
FIG. 3 is a side elevation of a second embodiment of a remote control temperature sensor according to the invention.
FIG. 4 is an axial section of the FIG. 3 remote control temperature sensor.
FIG. 5 is a cross-section of the remote control temperature sensor according to FIG. 3.

In the embodiment of the remote control temperature sensor according to FIGS. 3 to 5, those parts corresponding to the first example are provided with the same reference numerals but provided with an inverted comma, so that they need not be described in detail.

The important differences from the first example are that the housing 1' is substantially of trapezium outline in cross-section and the expansible material capsule 9' is horizontal instead of upright, each end being disposed in a slide bearing in the form of a part-cylindrical recess 15' of the base 3' of which the underside is provided with a layer of adhesive for securing to the wall 19 or the like. The cap 2' has only one slit 7' parallel to the rotary axis of the expansible material capsule 9 at the rim of the cap 2'.

We claim:

1. A remote control temperature sensor for operating a temperature regulating valve, comprising, a housing having an outlet aperture, a cylindrically shaped capsule mounted in said housing containing a temperature responsive expansible material, a flexible capillary tubing, of length frequently in excess of the distance between said valve and said capsule, communicating with said capsule; said capsule having therearound at least some of the excess length of said tubing wound into a coil about said capsule when it is used to sense temperature in the vicinity of said capsule at said distance remote from said valve, said tubing being let out of said sensor housing through said outlet aperture, said capsule being mounted in the sensor housing about an axis coincident with the axis of said coil, said housing including a detachable cap having an outlet slot for said tubing.

* * * * *